No. 864,301. PATENTED AUG. 27, 1907.
E. M. HARRIS & C. J. LE VALLEY.
CORN HARVESTER AND HUSKER.
APPLICATION FILED FEB. 20, 1906.
4 SHEETS—SHEET 1.
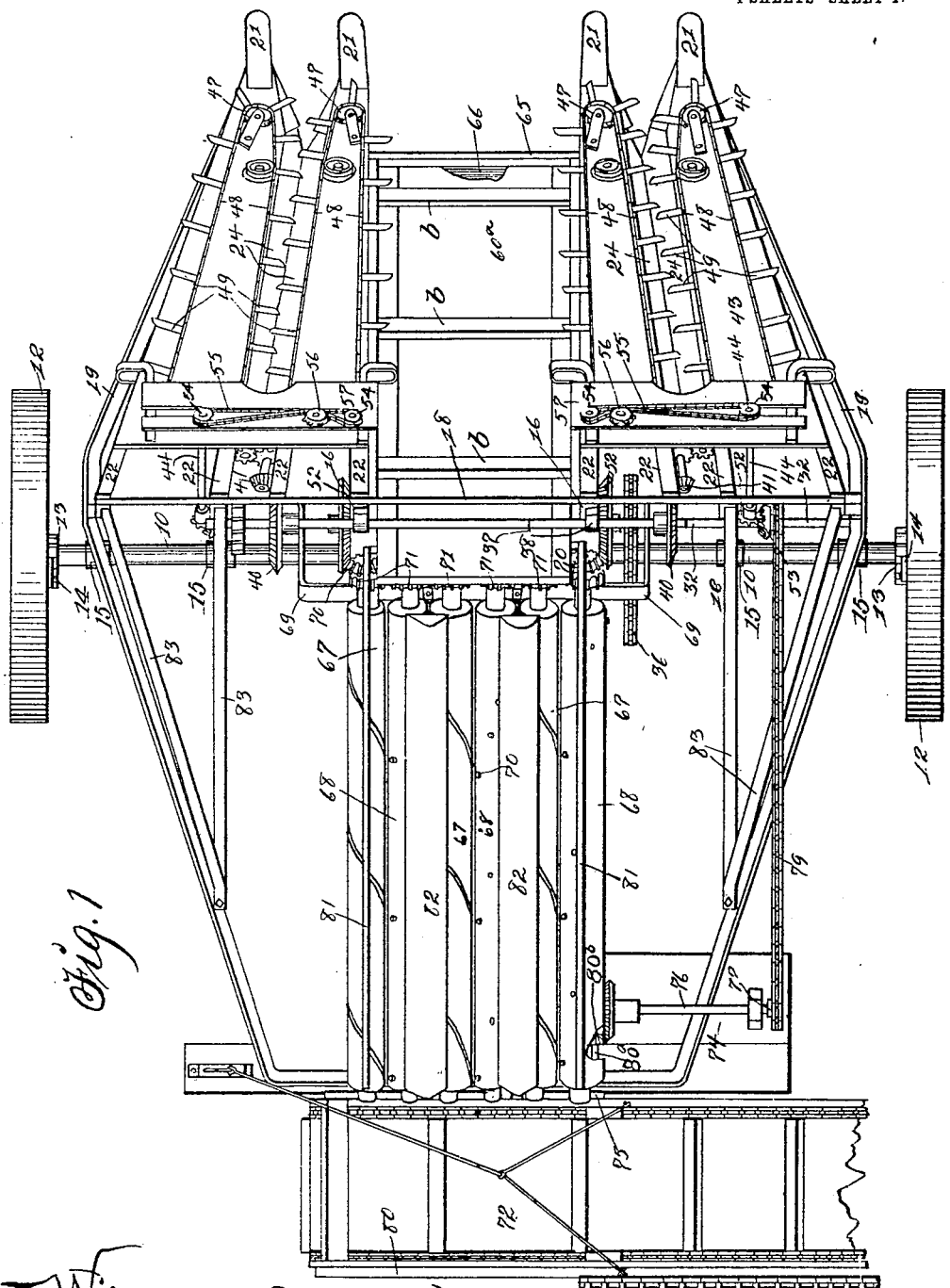

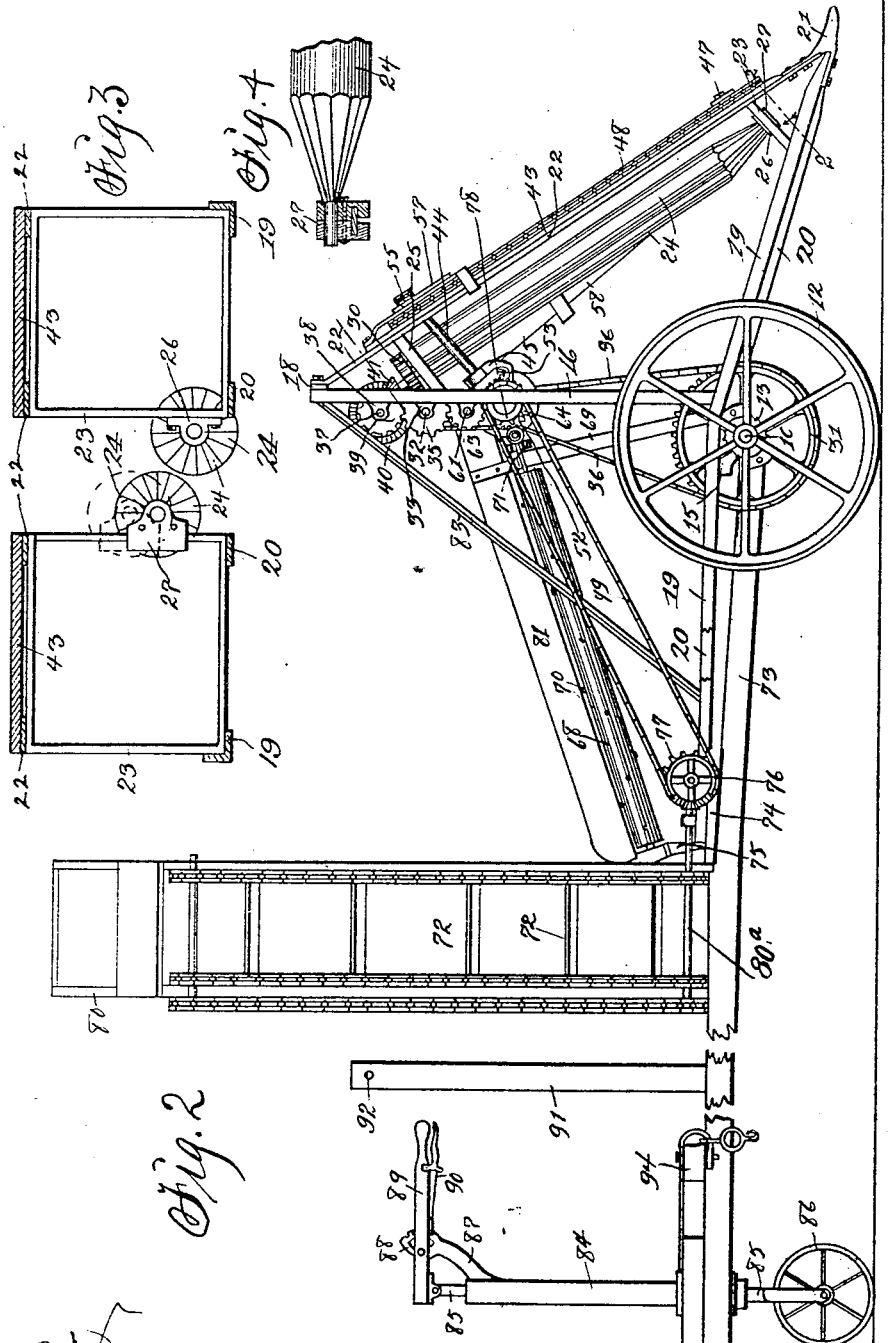

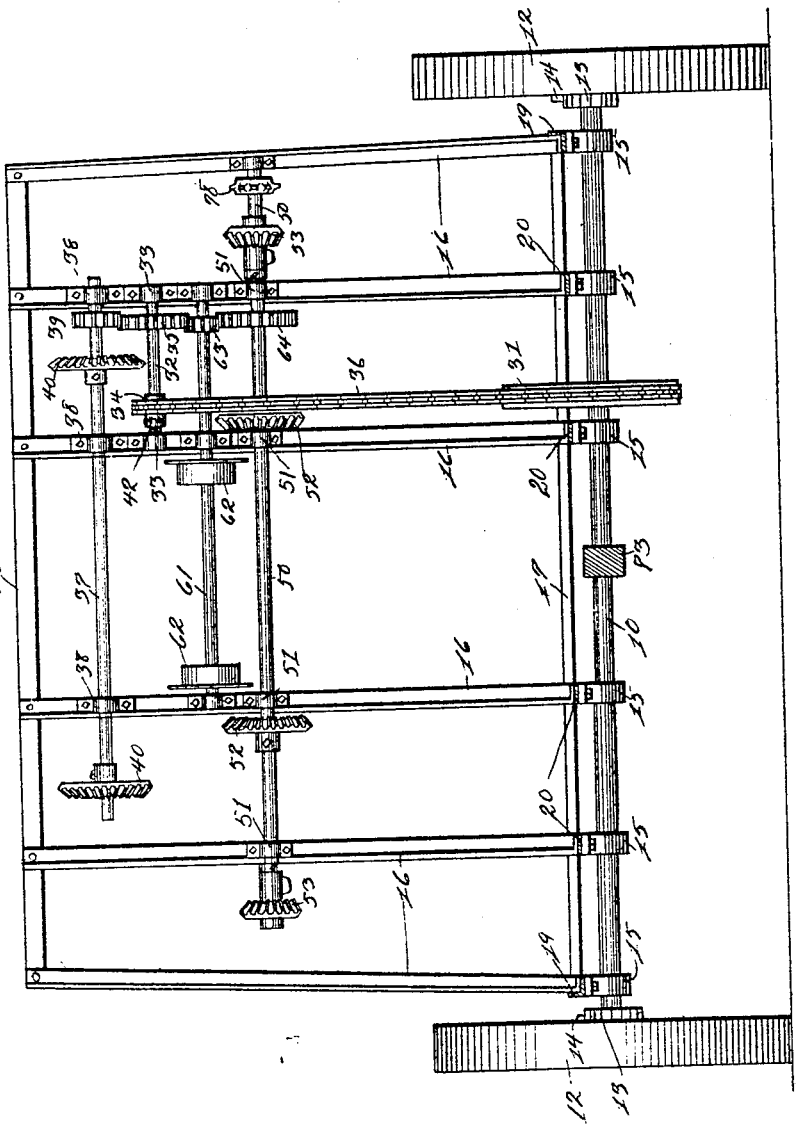

No. 864,301.
PATENTED AUG. 27, 1907.
E. M. HARRIS & C. J. LE VALLEY.
CORN HARVESTER AND HUSKER.
APPLICATION FILED FEB. 20, 1906.
4 SHEETS—SHEET 4.
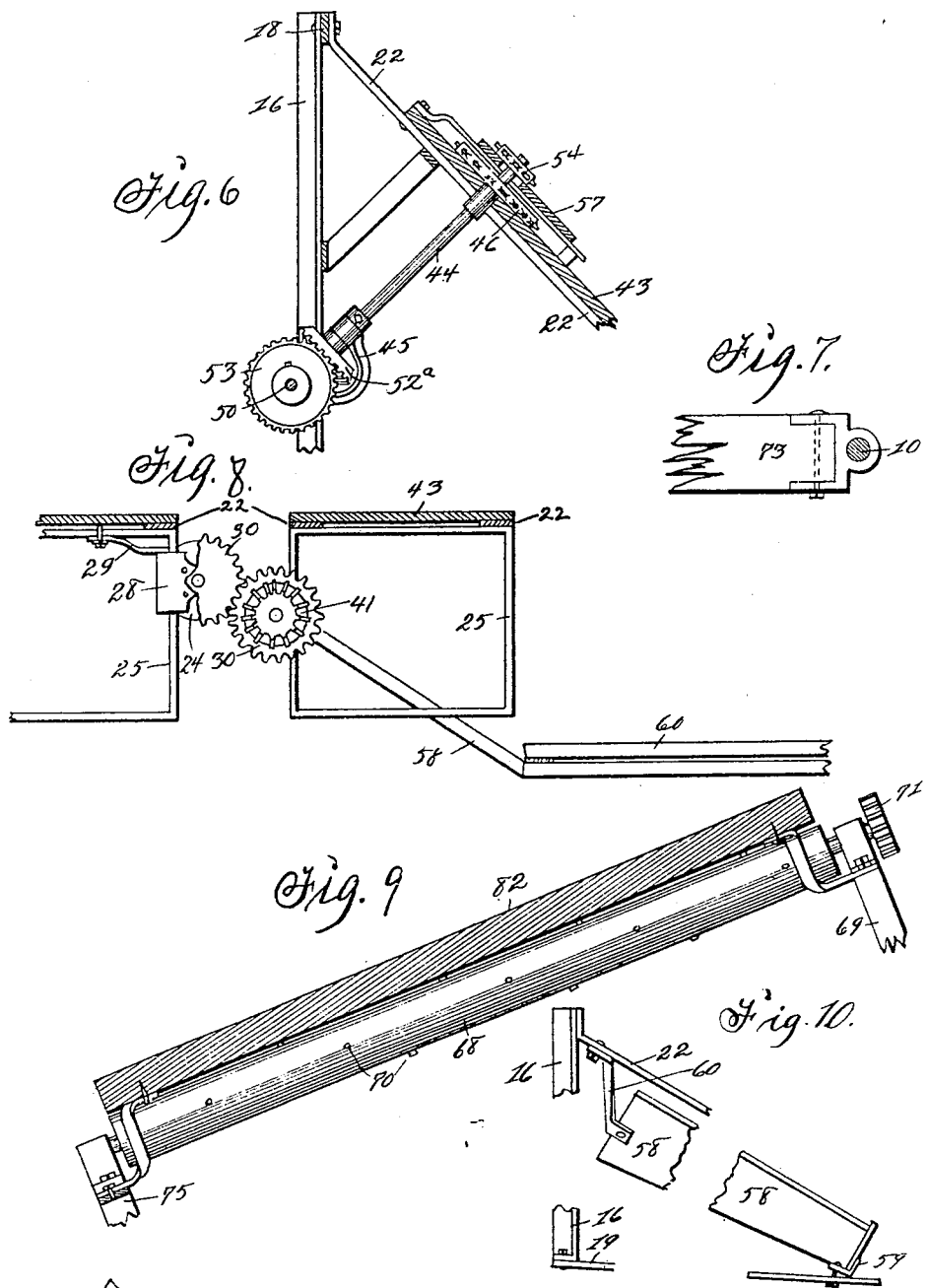

UNITED STATES PATENT OFFICE.

EVART M. HARRIS AND CHARLES J. LE VALLEY, OF SHEFFIELD, IOWA.

CORN HARVESTER AND HUSKER.

No. 864,301.  Specification of Letters Patent.  Patented Aug. 27, 1907.

Application filed February 20, 1906. Serial No. 302,106.

*To all whom it may concern:*

Be it known that we, EVART M. HARRIS and CHARLES J. LE VALLEY, citizens of the United States, residing at Sheffield, in the county of Franklin and State of Iowa, have invented a new and useful Corn Harvester and Husker, of which the following is a specification.

Our object is, first, to provide a machine for picking corn from stalks of two rows at a time in the field when it is propelled by horses hitched to an adjustable pole in rear of the machine. Second, to provide a carriage frame that is widest at its center, inclined inwards at its ends and downwards in front and rear from its center and specially adapted for supporting picking rollers in a forwardly and downwardly inclined position, an endless carrier between them and husking rollers in a rearwardly and downwardly inclined position as required to coact in gathering and husking corn as the machine is advanced. Third, to provide means for adjusting the pole and guiding the advance of the machine and also for raising and lowering the front end of the machine relative to the ground. Fourth, to provide pairs of rollers for picking corn from stalks and locating one in each pair in a higher plane than the other as required to cause ears of corn to fall inwards upon an endless carrier to convey them upwards to fall upon husking rollers. Fifth, to combine three pairs of husking rollers to strip off husks and deliver the corn to a conveyer to carry it to a wagon at the side of the machine. Sixth, to provide one roller in each pair of husking rollers with spiral grooves and the mating roller with a plurality of teeth for traversing the grooves and biting and tearing off husks. Seventh, to provide adjustable bearings for the outer picking roller in each pair to allow the roller to be self-adjusting relative to its mating roller and the corn stalks that enter between the rollers as the machine is advanced. Eighth, to locate endless chains above the picking rollers and provide them with fingers to engage corn stalks and to coact with the picking rollers in gathering and delivering corn to the endless carrier between the two pairs of picking rollers. Ninth, to provide inclined platforms above the picking rollers to support the chains having fingers that project laterally relative to the platforms to engage corn stalks and ears. Tenth, to combine deflectors with the husking rollers to direct corn relative to the rollers.

Our invention consists in the construction, arrangement and combination of elements and subcombinations as hereinafter set forth, pointed out in our claims and illustrated in the accompanying drawings in which:—

Figure 1 is a top view of the machine and shows the contour of the frame and the positions of various operative parts relative to each other and the frame. Fig. 2 is a side elevation of the machine from which parts of the pole are broken away and also shows the inclined positions of the picking rollers and the husking rollers relative to each other and the central uprights of the frame. Fig. 3 is an enlarged transverse sectional view and shows the positions of the two picking rollers at their lower ends relative to each other and the two parallel parts of the frame that supports them, the lower one in a fixed bearing and the upper one in a vertically adjustable bearing. Fig. 4 is a horizontal sectional view of the vertical adjustable bearing that supports the upper roller in the pair. Fig. 5 is a rear view of the central upright position of the machine frame and the horizontal shafts and gearing connected therewith for actuating the various operating mechanisms in the machine. Fig. 6 is an enlarged sectional view that shows the gearing for transmitting power from one of the horizontal shafts to the endless chains that have fingers for engaging and moving corn relative to the picking rollers. Fig. 7 shows how the pole is pivotally connected with the axle. Fig. 8 shows how the corn is directed from the picking rollers to the endless carrier by means of an inclined plane between them. Fig. 9 shows how the deflectors on top of the husking rollers are supported between each pair of rollers in a plane above the rollers as required to direct corn to each pair of rollers. Fig. 10 shows how inclined planes are supported to direct corn to an endless carrier.

The numeral 10 designates an axle about seven and a half feet long, rotatably connected with wheels 12 about thirty two inches in diameter, by means of ratchets 13 fixed on the axle and pawls 14 pivoted to the wheel in such a manner that the axle will rotate when the machine is moved forwards and remain idle when the machine is moved backwards. Bearings 15 are connected with the main frame and the axle 10 is rotatably mounted in the bearings 15, as shown in Fig. 5, and project forward, as shown in Fig. 2, to support a plurality of upright bars 16 fixed to the bearings to produce the vertical central part of the frame. The lower ends of the uprights 16 are connected by a cross bar 17 and their top ends by a cross bar 18 as shown in Fig. 5. Horizontal angle bars 19 are fixed on the outside bearings 15 and their front end portions are inclined inward as shown in Fig. 1 and downward as shown in Figs. 1 and 2 and their rear portions extend in a straight horizontal plane and incline inwards as shown in Fig. 2 and their rear end portions extend in a straight horizontal plane and incline inwards as shown in Fig. 1. On the inside of the angle bars 19, at some space therefrom, are bars 20 fixed to bearings 15 on the axle 10 as shown in Fig. 5 to extend forward and backward in parallel position with the angle bars 19 in pairs on each side of the machine for supporting shoes 21 fixed to their front ends, as shown in Fig. 2, and gearing at their rear ends as shown in Figs. 1 and 2.

In the top cross bars 18 are fixed in pairs straight bars 22 and connected at their lower end with the horizontal bars 19 by square frames 23 fixed thereto, as shown in Fig. 3, to support the lower ends of pairs of picking rollers 24. To the upper ends of the bars 22 are fixed square frames 25 to support the upper ends of the rollers 24 as shown in Fig. 8. The inner roller 24 of each pair is supported at its lower end in a bearing 26 fixed to the frame 23 and the upper and outer roller 24 in each pair is journaled in an adjustable bearing 27 that is slidably connected with the inner upright of the outer frame 23 as shown in Figs. 3 and 4 in a plane above the bearing 26. The upper ends of the outer rollers 24 are journaled in bearings 28 adjustably connected with the frames 25 as shown in Fig. 8 and the upper ends of the inner rollers are journaled in fixed bearings on the inner frame 25 in the same manner as the bearings 26 are fixed to the inner lower frames. Springs 29 fixed to the frame, normally depress the bearings 28 as required to keep the mating wheels 30 on the ends of the rollers in gear and also to allow the upper rollers in each pair to rise when necessary to allow corn stalks to pass through between the rollers as required to prevent clogging.

To actuate the picking rollers 24 a drive wheel 31 is fixed on the axle 10, a shaft 32 journaled in bearings 33 fixed to uprights 16, as shown in Fig. 5, a sprocket wheel 34 mounted loosely on the shaft, a gear wheel 35 fixed to the shaft and the drive wheel 31 and the sprocket wheel 34 connected by a chain 36. A second shaft 37 is in bearings 38 above the shaft 32 and has a fixed pinion 39 that engages the gear wheel 35, as shown in Fig. 5 and miter gear wheels 40 on the shaft 37 engage pinions 41 as shown in Fig. 2, and as required to rotate each pair of rollers 24 towards each other. A clutch 42 on the shaft 32 serves as a means for making the sprocket wheel 34 an idler as required to stop the operation of the picking rollers 24.

Platforms 43 are fixed on the inclined bars 22 and shafts 44 are mounted in curved bearings 45 fixed to uprights 16 and the shafts extend up through the platforms as shown in Fig. 6. Near upper ends of the shafts 44 are fixed sprocket wheels 46 and on the lower ends of the platforms 43 are mounted idlers 47 as shown in Fig. 2. Endless chains 48 having fingers 49 are mounted on the sprocket wheels 46 and the idlers 47. To actuate the outer chains 48 as required to contact with corn stalks by their fingers, and to move the corn when the machine is moving forward astride two rows of corn a shaft 50 is fixed in bearings 51, as shown in Fig. 5 and has fixed miter gears 53 that engage the miter gears 52 on the lower ends of the shafts 44 as shown in Fig. 6. To actuate the inner chains 48 sprockets 54 are fixed to the upper ends of the shafts 44 and connected by chains 55 as shown in Fig. 1. Chain tighteners 56 are connected with the chains 55. Auxiliary small platforms 57 are fixed to the upper ends of the platforms 43 as required to support the chains 55 in a plane above the sprocket wheels 46. Downwardly and inwardly inclined planes 58 are attached to supports 59 and 60 that are fixed to bars 22 and 19 as shown in Fig. 10. An endless carrier 60ª, having fixed cross slats b, is mounted between the two pairs of husking rollers 24 on a shaft 61 (shown in Figs. 2 and 5) that has flanged friction wheels 62 at its ends, as shown in Fig. 5. The shaft 61 has a pinion 63 that engages a gear wheel 64 on the shaft 50 to transmit power and motion from the shaft 32 to the shaft 61 as required to coöperate the endless carrier 60 with the husking rollers 24 as shown in Fig. 5. A board 65 is fixed to the inclined planes 58 in a vertical plane to prevent corn from falling off the lower end of the endless carrier as shown in Fig. 1 and the roller 66 that supports the endless carrier 60ª is also shown in Fig. 1 where part of the carrier is broken away.

Three pairs of husking rollers 67 and 68 are mounted in parallel positions in a plane below the upper ends of the picking rollers 24 and the endless carrier 60ª and inclined rearwards and downwards. Their upper ends are journaled in a frame 69 that is fixed to the lower cross-bar 17 (shown in Fig. 5) and the journals of the outer rollers have fixed pinions 70 that engage the miter gear wheels 52ª as shown in Fig. 1 and as required to actuate the husking rollers 67 and 68. One roller, 67, in each pair is spirally grooved and its mate 68 has fixed pins 70 that transverse the grooves when the machine is in operation, to aid in stripping husks from ears of corn as they descend by force of gravity upon the rollers. Each roller in each pair has a fixed gear wheel 71 at its upper end as required to rotate the rollers in each pair towards each other to strip husks from ears of corn and force the husks downward and out of the machine while the stripped ears slide down to fall upon an endless carrier 72, that is horizontal at its lower end portion in a conveyer frame connected with a base 74 at its rear and lower end as shown in Figs. 1 and 2. A pole, 73, is connected with the axle 10 as shown in Fig. 7 and the base 74 for supporting gearing is fixed on top of the pole and bearer 75 is fixed on the base to support the lower ends of the husking rollers 67 and 68, as shown in Fig. 2, or in any suitable way. A shaft 76 is mounted on the base 74 as shown in Figs. 1 and 2 and has a fixed sprocket wheel 77 that is connected with a sprocket wheel 78 on the shaft 50 by a chain 79 to impart power and motion to the endless carrier 72 in the conveyer frame 80, by the shaft 80ª by bevel gearing 80ᵇ as shown in Figs. 1 and 2. Side boards 81 located at the sides of the outer husking rollers 68 as shown in Figs. 1 and 2 prevent corn from falling outward. Two fenders, 82, located above the husking rollers as shown in Fig. 1 separate and direct the corn as it falls from the endless carrier 60, to be operated upon advantageously by the three pairs of rollers. They are supported above the rollers as shown in Fig. 9 or in any suitable way. Braces 83 are fixed to the cross bar 18 at the top of the frame 10 and to the side bars 19 at the sides of the frame, as shown in Fig. 1. A tubular post 84 is fixed on the rear end of the pole 73 and a shaft 85 extended therethrough to carry a guide wheel 86. An arm 87 projects upward from the post and terminates in a rack 88. A lever 89 is fulcrumed to the arm and pivoted to the top of the shaft 85 and a pawl 90 is connected with the long arm of the lever to engage the rack 88.

By pressing the lever laterally to rotate the shaft 85 the direction of the machine to the right or left may be readily changed and by depressing or lifting the long arm of the lever the front end of the frames 19 and the front ends of the picking rollers may be advantageously raised and lowered relative to the ground.

A post 91 is fixed on the pole 73 and a bar 92 is fixed in the top of the post to extend horizontally for supporting driving lines to facilitate governing horses hitched to swingletrees that may be connected with the doubletree 94 pivoted to the pole 73 as shown in Fig. 2, or in any suitable way.

Having thus set forth the purposes of our invention and the construction, arrangement and combination of all the elements and subcombinations and their functions the practical operation and utility of the machine may be readily understood by persons familiar with the art to which it pertains.

What we claim as new and desire to secure by Letters Patent, is

1. In a corn harvester, a frame consisting of bars inclined inward and towards each other from points near their centers and rigidly connected at their rear ends, a plurality of upright bars connected by cross bars at their tops and bottoms, the ends of the lower cross bars being fixed to the central portions of the first named bars and bars fixed to the ends of the top cross bar and to the front ends of the bars.

2. In a corn harvester, a frame consisting of horizontal bars inclined inward and towards each other from points near their centers and rigidly connected at their rear ends, a plurality of upright bars connected by cross bars at their tops and bottoms and the ends of the lower cross bars fixed to the central portions of the bars and bars fixed to the ends of the top cross bar and to the front ends of the horizontal bars and pairs of bars fixed to the end portions of the top cross bar and inclined downward for supporting pairs of picking rollers, and picking rollers mounted thereon.

3. In a corn harvester, a frame consisting of horizontal bars inclined inward and towards each other from points near their centers and rigidly connected at their rear ends, a plurality of upright metal bars connected by cross bars at their tops and bottoms and the ends of the lower cross bar fixed to the central portions of the horizontal bars and straight bars fixed to the ends of the top cross bar and to the front ends of the horizontal bars and pairs of bars fixed to the end portions of the top cross bar and inclined inwardly and downwardly for supporting pairs of picking rollers, square frames fixed to said pairs of straight bars and pairs of picking rollers mounted in said frames.

4. In a corn harvester, two picking rollers, one in fixed bearings and the other in a higher plane and in self-adjusting bearings slidably connected with fixed supports, in combination with an endless carrier aside of the lower roller.

5. In a corn harvester, two pairs of picking rollers in the front of a machine in parallel position and inclined upwardly and rearwardly and a single endless carrier between the two pairs of rollers and inclined upwardly and rearwardly and means between the inner roller of each pair and the endless carrier to direct corn from the picking rollers to the endless carrier.

6. In a corn harvester, two pairs of picking rollers in the front of the machine in parallel position and inclined upwardly and rearwardly, a platform over each roller, a chain having fingers above each platform, an endless carrier between the two pairs of rollers and inclined upwardly and rearwardly, the outer roller in each pair being in a plane above the inner roller and fixed inclined planes between the inner rollers and the endless carrier to direct corn from the picking rollers to the endless carrier.

7. In a corn harvester, two pairs of picking rollers in the front of a machine in parallel position and inclined upwardly and rearwardly, a platform over each roller, a chain having fingers above each platform, an endless carrier between the two pairs of rollers and inclined upwardly and rearwardly the outer roller in each pair being in a plane above the inner roller, fixed inclined planes between the inner rollers and the endless carrier and means for coöperating the two pairs of picking rollers the endless chains and the endless carrier, as set forth.

8. In a corn harvester, two pairs of picking rollers in the front of a machine in parallel position and inclined upwardly and rearwardly, a platform over each roller, a chain having fingers above each platform, an endless carrier between the two pairs of rollers and inclined upwardly and rearwardly, the outer roller in each pair being in a plane above the inner roller, fixed inclined planes between the inner rollers and the endless carrier to direct corn from the picking rollers to the endless carrier, means for coöperating the two pairs of picking rollers, the endless chains, the endless carrier and pairs of husking rollers in rear of the endless carrier and inclined downward from the top of the endless carrier arranged and combined to operate as set forth.

9. In a corn harvester, a machine frame inclined inwardly and downwardly at its front end, pairs of bars fixed to the top of the machine frame and connected with the lower front end portion of the machine frame, pairs of picking rollers mounted on said pairs of bars to incline inwards and rearwards, platforms in a plane above the rollers in parallel relation therewith, endless chains having fingers projecting laterally therefrom mounted on said platforms, means to transmit power from the rotatable axle that supports the machine frame to the pairs of picking rollers and to the chains in each pair and gearing to transfer power and motion from one endless chain to the other in each pair of chains, as set forth.

10. In a corn harvester, a frame, two pair of picking rollers at the front of the frame, inclined planes aside of the inner roller of each pair of rollers, an endless carrier between the inclined planes, an endless carrier extending upward and rearwardly from the front end of the frame between the two pairs of picking rollers to its center and three pairs of husking rollers extending rearwardly and downwardly from the top end of the carrier, to operate as set forth.

11. In a corn harvester, a frame supported upon a rotatable axle, two pairs of picking rollers on the front of the frame and the inner roller of each pair in an adjustable bearing as shown, an inclined plane at the side of each inner roller, an endless carrier between the two inclined planes and three pairs of husking rollers extending rearwardly and downwardly from the top end of the carrier and one of the rollers in each of said three pairs spirally grooved and its mating roller provided with fixed pins to traverse said grooves, arranged and combined to operate as set forth.

EVART M. HARRIS.
CHARLES J. LE VALLEY.

Witnesses:
 WM. STORCK,
 J. S. WARTWABY.